(12) United States Patent
Vanhatupa et al.

(10) Patent No.: US 10,299,142 B2
(45) Date of Patent: May 21, 2019

(54) WIRELESS NETWORK PLAN WITH MULTI BAND ACCESS POINTS

(71) Applicant: Ekahau Oy, Helsinki (FI)

(72) Inventors: Timo Vanhatupa, Hameenlinna (FI); Jarno Leppanen, Helsinki (FI)

(73) Assignee: EKAHAU OY (FI)

( * ) Notice: Subject to any disclaimer, the term of this patent is extended or adjusted under 35 U.S.C. 154(b) by 0 days.

(21) Appl. No.: 16/010,114

(22) Filed: Jun. 15, 2018

(65) Prior Publication Data

US 2018/0368002 A1     Dec. 20, 2018

(30) Foreign Application Priority Data

Jun. 20, 2017   (FI) ..................................... 20175579

(51) Int. Cl.
*H04W 16/18*     (2009.01)
*H04W 88/08*     (2009.01)

(52) U.S. Cl.
CPC ............ *H04W 16/18* (2013.01); *H04W 88/08* (2013.01)

(58) Field of Classification Search
CPC ..... H04W 84/12; H04W 88/08; H04W 16/18; H04W 48/16; H04W 84/18; H04W 40/02; H04W 4/02; H04W 4/80; H04W 84/20; H04W 88/10; H04W 92/20; H04W 16/20; H04W 24/02; H04W 40/248; H04W 4/023; H04W 56/001; H04W 64/003; H04W 72/0426; H04W 84/045; H04W 16/16; H04W 24/00; H04W 40/12; H04W 40/125; H04W 40/24; H04W 4/00; H04W 4/021; H04W 4/025; H04W 4/04; H04W 4/50; H04W 88/085
See application file for complete search history.

(56) References Cited

U.S. PATENT DOCUMENTS

| 2004/0147267 | A1  | 7/2004 | Hill et al. |
| 2006/0050634 | A1* | 3/2006 | Gous ............... H04L 41/0896 370/229 |
| 2006/0064497 | A1  | 3/2006 | Bejerano et al. |
| 2006/0068781 | A1* | 3/2006 | Lam .................. H04W 48/16 455/434 |
| 2008/0056184 | A1  | 3/2008 | Green |
| 2014/0147107 | A1* | 5/2014 | Swinkels ............ H04L 45/24 398/9 |

(Continued)

FOREIGN PATENT DOCUMENTS

WO    WO 2009055058    4/2009

*Primary Examiner* — Daniel Lai
(74) *Attorney, Agent, or Firm* — Squire Patton Boggs (US) LLP

(57) ABSTRACT

A network planning tool for a merged plan comprising multi-band access points having radio groups merges at least a first and a second frequency-band-specific plan. Firstly, a set of pairs, each pair having a radio from the first plan as a first element and a radio from the second plan as a second element is created and utilities are assigned to the pairs. Then a subset of pairs that maximizes a sum of utilities and contains any radio from the first and second plan at most once is selected. The merged plan is created by placing radios in a pair in the selected subset into the same radio group and selecting a location of the radio group based on locations of corresponding radios in the first and second frequency-band-specific plans.

20 Claims, 5 Drawing Sheets

(56) References Cited

U.S. PATENT DOCUMENTS

2014/0148175 A1   5/2014   Luo
2016/0093206 A1   3/2016   Pfeifle
2016/0323862 A1   11/2016  Lee et al.

* cited by examiner

WIRELESS NETWORK PLAN WITH MULTI BAND ACCESS POINTS

RELATED APPLICATIONS

This application claims priority to Finnish patent application no. 20175579, filed on Jun. 20, 2017, the contents of which is hereby incorporated herein by reference in its entirety.

FIELD

The invention relates to radio network planning.

BACKGROUND

A typical wireless network includes a plurality of access points providing wireless access. There are a wide variety of network planning tools available for wireless network planning and design to create, based on requirements given by a user and information on a physical environment, network plans that indicate where to place access points, and possibly also how to configure the access points to provide wireless access fulfilling the requirements. There exist so-called multi band access points that are physical access points containing multiple radios operating in different frequencies. Using as few physical access points as possible is also one target in network planning to facilitate deployment and maintenance, for example. Current network planning tools create frequency-band-specific plans, and for the time being there is no mechanism that would automatically create from frequency-band-specific plans a multi-frequency band network plan.

SUMMARY

The invention relates to a method, an apparatus, and a program product which are characterized by what is stated in the independent claims. The preferred embodiments are disclosed in the dependent claims.

A general aspect introduces creating from different network plans a merged plan that maximizes utility. Radios to be merged are placed to the same radio group for an access point whose location is based on original locations of the radios.

BRIEF DESCRIPTION OF THE DRAWINGS

In the following different embodiments of the invention will be described in greater detail with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s)/example(s), or that the feature only applies to a single embodiment/example. Single features of different embodiments/examples may also be combined to provide other embodiments.

The present invention is applicable to any wireless network planning application configured or configurable to support radio disablement. The type of the wireless network(s) is irrelevant. For example, one or more plans may be for a network according to fifth generation (5G) system, beyond 5G, and/or wireless networks based on IEEE 802.xx specifications, such as IEEE 802.11 (WLAN) and IEEE 802.15, or any combination thereof. 5G has been envisaged to use a so-called small cell concept including macro sites operating in co-operation with smaller local area access points (access nodes), and perhaps also employing a variety of radio technologies. 5G system may also incorporate both cellular (3GPP) and non-cellular (e.g. IEEE) technologies.

Figure 1:
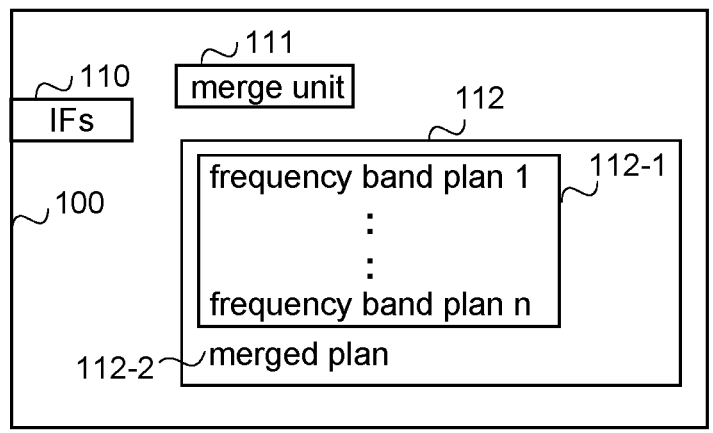
FIG. 1 illustrates an exemplified computing device.

FIG. 1 illustrates a simplified computing device describing only some logical units with their operative connections, the implementation of which may deviate from what is presented. It is obvious to a person skilled in the art that the computing device may also comprise other functions and structures that need not be described in greater detail here, or be part of a computing environment comprising one or more computing devices. The more detailed structure of the computing device or a computing environment is irrelevant to the actual invention, and therefore is not described in more detail herein.

The computing device 100 may be any computing apparatus that can be configured to run at least one application that is configurable to merge frequency-band-specific network plans. For that purpose the computing device 100 comprises a merge unit 111, and in a memory 112 at least temporarily frequency-band-specific network plans 112-1, and one or more merged plan 112-2. The computing device 100 further comprises one or more interfaces (IFs) 110, such as a user interface allowing the plans to be displayed/outputted to a user. The user interface may be provided by one or more integrated or external display devices. A display device may be any kind of a screen or other display unit providing a graphical user interface, either external to the apparatus or integrated to the apparatus. Examples of such display devices include different screens, like a touchscreen, a display screen, a projection screen, a TV screen, and monitors, like a computer monitor and a portable display monitor. Naturally there may be other interfaces for user inputs, like keypads, memory sticks, etc.

The computing device 100 illustrated in FIG. 1 represents one example which may be implemented by one apparatus Examples of such apparatuses include a user terminal or a work station, such as a laptop, a smartphone, a personal computer, a tablet computer, a field device. Instead, or in addition to, a distributed computing device may be used that may use cloud computing or grid computing, and/or a dedicated server, for example.

In the below examples, a term radio group is used to describe two or more radios that are planned to be placed in one physical access point.

Figure 2:
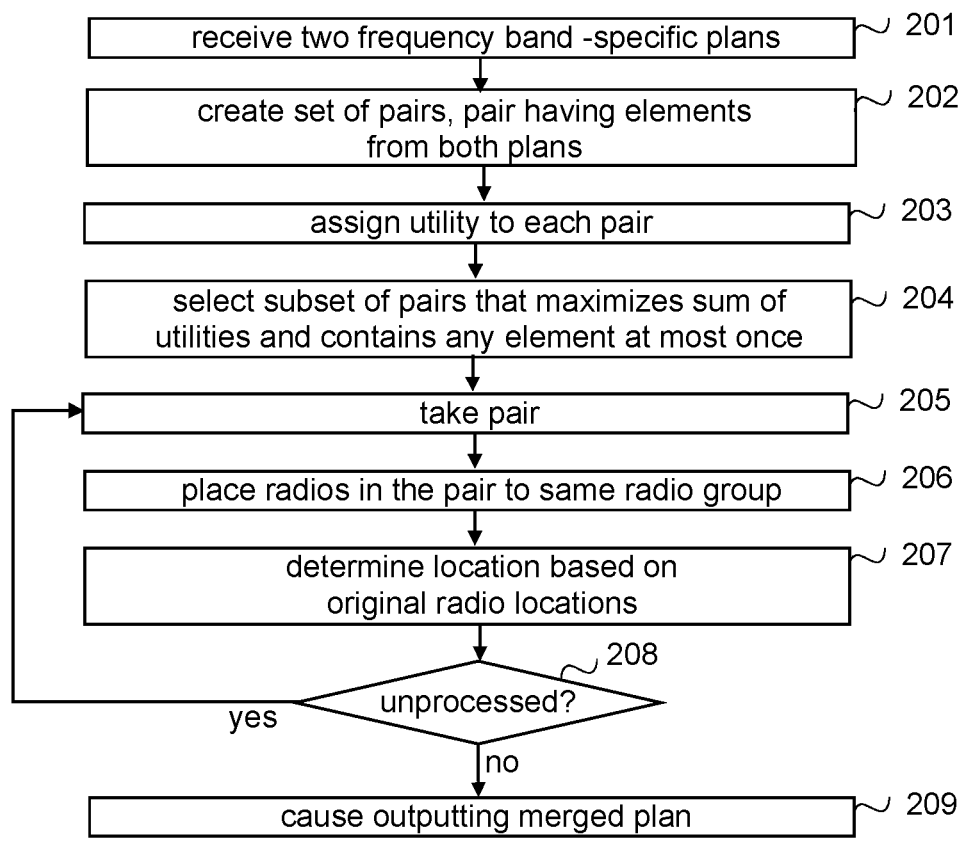
FIGS. 2 to 4 illustrate exemplified processes.

FIG. 2 is a flow chart illustrating functionality of a multi band network planning tool, or more precisely functionality of the merge unit providing the multi band network planning tool. In the illustrated example it is assumed that two frequency-band-specific plans are processed. For example, one of the plans may be for 2.4 GHz WLAN and the other one for 5 GHz WLAN, without restricting the example to such a solution. As will be evident from the below, the used frequencies or network technologies bear no importance.

The process starts when the two frequency-band-specific network plans, called below a first plan and a second plan, are received in step 201. It is irrelevant how and with which tool the frequency-band-specific network plans are created, and whether they are imported to the computing device, retrieved by the computing device, or whether the merge unit is a sub-unit in a network planning tool.

From the two frequency-band-specific plans a set of pairs is created in step 202 so that each pair has a radio from the first plan as a first element and another radio from the second plan as a second element. Each radio in the first plan is paired with each radio in the second plan.

Then each pair is assigned in step 203 with a utility. Any kind of utility may be assigned to the pairs. For example, the utility may be based on physical distances of the corresponding radios in the different frequency-band-specific plans, preferably set so that it favors radios locating near to each other. In such a case, the closer physical locations of the radios in the first and second frequency-band-specific plans are, the larger the utility is. Alternatively, or additionally, the utility may depend on the number of walls between the corresponding radios in the different frequency-band-specific plans. Still another example includes that each location of an access point is associated with user-defined importance, or one or more importance functions are used, and the utility is based on the importance(s). For example, having an access point in managing director's room, or in a working area, may be more important than having an access point in stairs or restrooms. A further example is that the utility depends on received signal strengths between the radios in the different frequency-band-specific plans. The signal strength takes into account the combined effect of walls and distance. Further, the better the signal strength, the more the radios interfere and the more beneficial merging the radios becomes. Naturally, the utility may be based on any combination of the above described examples.

Once the utilities are assigned, i.e. the set of pairs with utilities has been created, a subset of pairs which maximizes a sum of utilities and contains any radio (i.e. first or second element) from the first or second frequency-band-specific plan at most once is selected in step 204. In other words an optimum set of pairs, i.e. a subset maximizing the sum of utilities, may be obtained so that not all radios are merged. For example, there may be an unequal number of radios to merge, which necessarily results to at least one radio not being among any of the pairs in the selected optimum subset. Another example is that a radio may locate in a place that the utility obtained by merging the radio with any radio in the other plan is so small that the radio will not be merged.

When the selecting has been performed, a pair in the subset of pairs is taken in step 205 and corresponding radios are placed in step 206 to the same radio group, representing a physical multi-band access point that will have two radios operating on different frequency bands. Then the location of an access point corresponding to the radio group is determined in step 207 based on original locations of the radios placed in step 208 to the radio group. For example, the location may be an average of the original locations of the radios.

The steps 205 to 207 are repeated (step 208: yes) as long as there are, in the selected subset of pairs, pairs whose radios are not yet placed. In other words, the placing of two radios to one radio group and determining the location of the radio group is performed to each pair in the selected subset of pairs. Naturally, those elements that do not have a pair are included in the merged plan as radios in the intended location. When there are no pairs to be merged left (step 208: no), outputting a merged plan is caused in step 209. Then the automatically created merged plan may be further edited by a user and/or stored for later use.

The set of pairs may be created as a weighted bipartite graph and an efficient way to find the optimum subset of pairs is to use a minimum weighted perfect bipartite graph matching algorithm in said graph. In the graph, vertices correspond to radios, edges to radio pairs and edge weights to negated utilities, making the minimum matching correspond to a subset of pairs that maximizes the sum of utilities. The so-called Kuhn-Munkres algorithm is a common efficient algorithm for finding such subset of pairs.

The weighted bipartite graph is constructed so that for each radio in the first frequency-band-specific plan there is a vertex on a left side of the weighted bipartite graph and for each radio in the second frequency-band-specific plan there is a vertex on a right side of the weighted bipartite graph. If one side has fewer vertices than the other, dummy vertices representing disabled radios are added to the side with fewer vertices so that the number of vertices on both sides are equal. This makes the weighted bipartite graph balanced. After the matching, when the radios are merged, a pair having a dummy vertex will be a radio group representing a multi-band access point where the radio for the respective frequency band is disabled.

Edges of the weighted bipartite graph are constructed so that for each pair in the set of pairs there is a corresponding edge for which incident vertices correspond to radios in the pair. For each dummy vertex, there are dummy edges for each vertex on the opposite side of the graph with one of the incident vertices being the dummy vertex and the other being the vertex that corresponds to the radio on the other side. The graph is a complete bipartite graph as there is an edge for all possible vertex pairs where the first vertex is on the left side and the second vertex on the right side.

For the minimum matching, the utility of each pair is negated. The negated utility is assigned as an edge weight of the pair. If the minimum weighted perfect bipartite graph matching algorithm requires that the weights are not less than zero, the utilities can be subtracted from a large enough value such that the resulting weights are always nonnegative. The large enough value may be a constant value, received as a user input or being stored to the settings. For example, the large enough value may be the biggest one of the utilities. Naturally, the large enough value may be a variable, determined before assigning the utilities, in which case the value may depend on information in the received plans. For example if utilities are based on distance, the large enough value may depend on the maximum distance between radios in the received plans. For each dummy edge, any fixed value can be set as the edge weight. A simple way to set the weights is to use physical distances between access points of the radios in corresponding pairs. This negates a utility measure that favors proximity: the closer the radios are, the smaller the distance and the more beneficial it is to merge the radios.

It is straightforward process for one skilled in the art to implement other ways to select the subset of pairs that maximizes the sum of utilities. An example of another way is to iterate over all feasible subsets of pairs and select the one with the highest sum of utilities.

In the examples below, the bipartite graph is used as an example of the set of pairs without limiting the examples to the weighted bipartite graph.

Figure 3:
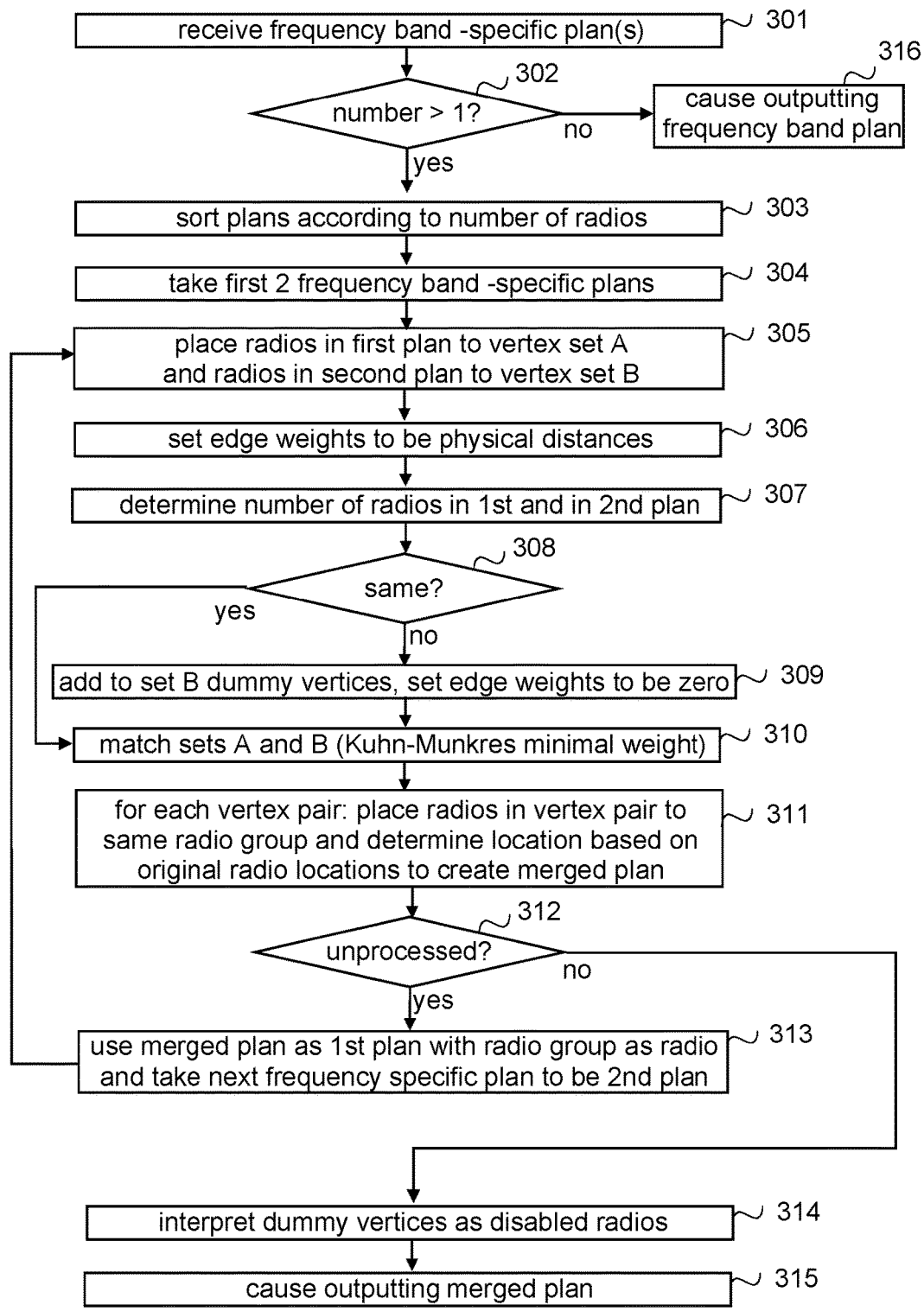

FIG. 3 is a flow chart illustrating functionality of a multi-band network planning tool, or more precisely functionality of the merge unit providing the multi band network planning tool, when one, two, three or more frequency-band-specific plans are processed. The illustrated example is further described by referring to FIGS. 5A to 7.

The process starts when one or more frequency-band-specific network plans are received in step 301. As above, also here it is irrelevant how and with which tool the frequency-band-specific network plans are created, and whether they are imported to the computing device, retrieved by the computing device, or whether the merge unit is a sub-unit in a network planning tool.

If the number of the received frequency-band-specific network plans is more than one (step 302: yes), the frequency-band-specific network plans sorted in step 303 so that the one having most radios will be the first in the order.

Then the two frequency-band-specific network plans that are the first and the second in the order are taken in step 304 to be processed. Vertices representing radios in the first frequency-band-specific network plan are placed in step 305 to vertex set A and vertices representing radios in the second frequency-band-specific network plan are placed in step 305 to vertex set B.

Figure 5A:
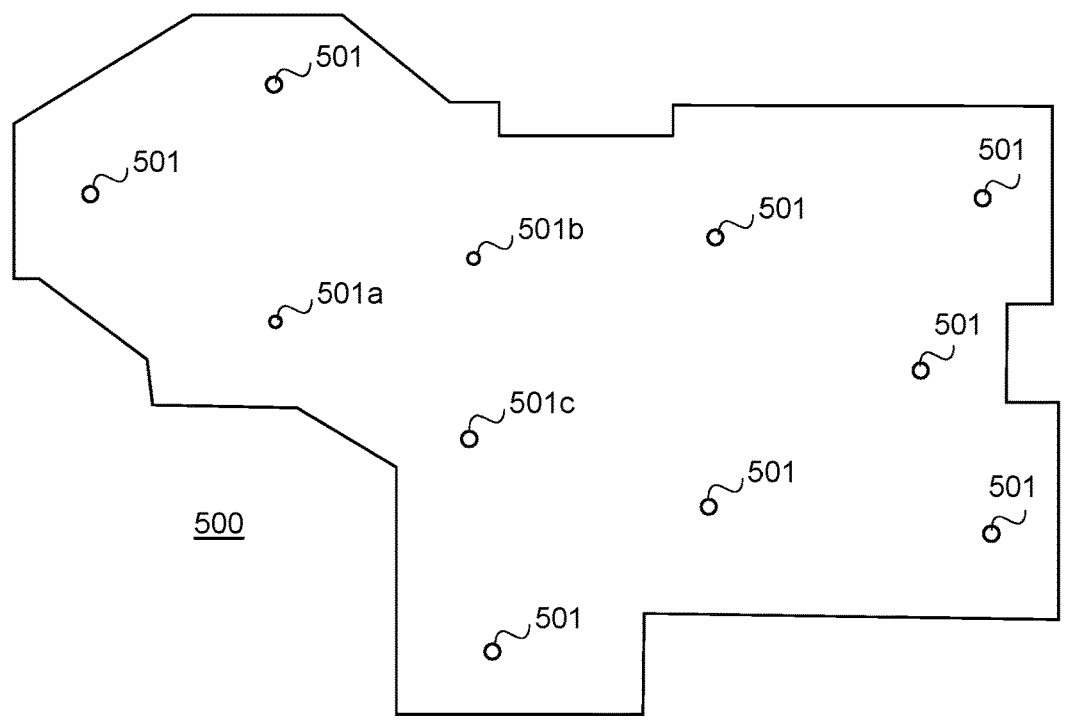
FIGS. 5A and 5B illustrate examples of different frequency-band-specific network plans.
Figure 5B:
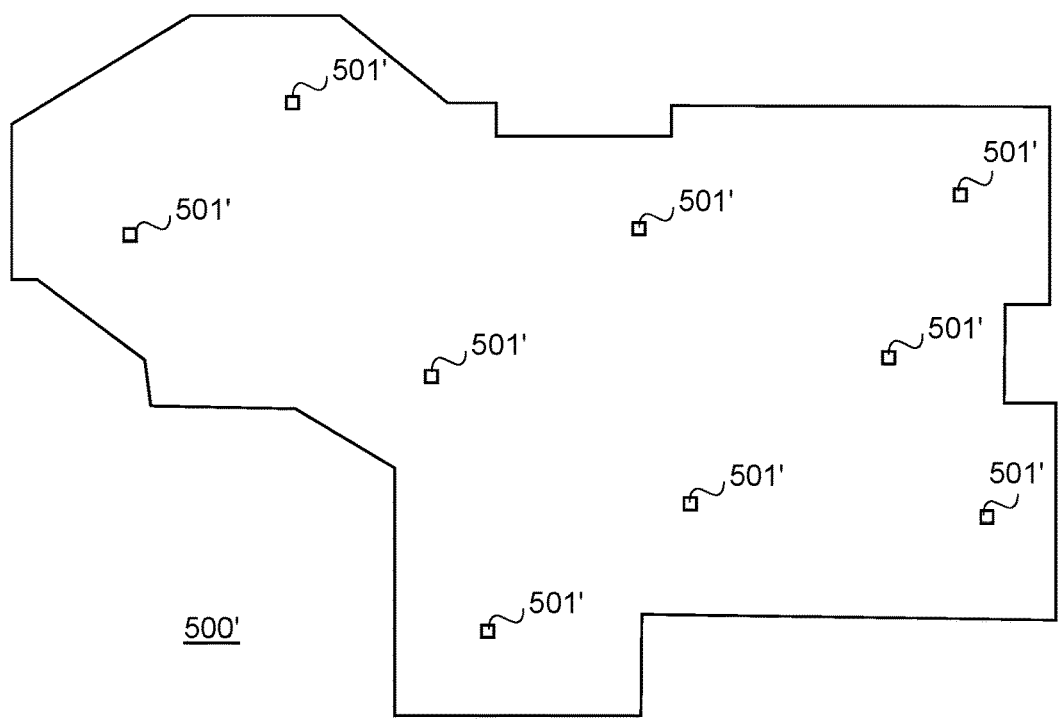
Figure 6:
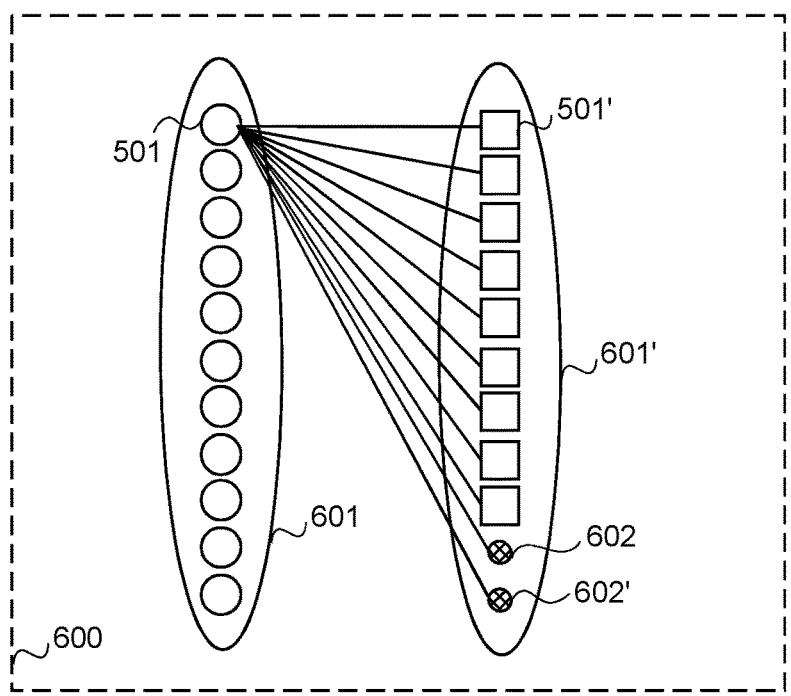
FIG. 6 illustrates an example on bipartite graph created using the examples in FIGS. 5A and 5B.

Assuming that the received network plans are those depicted in FIGS. 5A and 5B, the first frequency-band-specific network plan is the one depicted in FIG. 5A, the plan 500 comprising radios 501, 501a, 501b, 501c, the bipartite graph 600 illustrated in FIG. 6 comprises in vertex set A 601 vertices, depicted by circle, for each radio 501 (only one with reference numeral 501 in FIG. 6) in the frequency-band-specific network plan of FIG. 5B. Correspondingly, if the second frequency-band-specific network plan is the one depicted in FIG. 5B, the plan 500' comprising radios 501', the bipartite graph 600 illustrated in FIG. 6 comprises in vertex set B 601' vertices, depicted by square, for each radio 501' (only one with reference numeral 501' in FIG. 6) in the frequency-band-specific network plan of FIG. 5B.

Edge weights are set in step 306 to correspond physical distances of radios in the different frequency-band-specific plans.

Then, or simultaneously when placing, or before placing, the number of radios in the first frequency-band-specific network plan and the number of radios in the second frequency-band-specific network plan are determined in step 307. If the numbers are not the same (step 308: no), dummy vertices are added in step 309 to the vertex set B, so that each dummy vertex has a link to all vertices in the vertex set A. Further, edge weights to the dummy vertices are set to be zero. Naturally any other value may be used, as long as the same value is used for all dummy edges (dummy edge is an edge between a dummy radio and a non-dummy radio).

Referring back to the example illustrated in FIGS. 5A, 5B and 6, the number of radios in the frequency-band-specific network plan 500' in FIG. 5B is 11 and the number of radios in the frequency-band-specific network plan 500 in FIG. 5A is 9, so two dummy vertices 602, 602' are added to the vertex set B 601' illustrated in FIG. 6.

As can be seen from FIG. 6, the end result of adding dummy vertices is that the number of vertices in both vertex sets will be the same. Further, there will be a link from all vertices in the set A to all vertices, including the dummy ones, in the set B, and vice versa. The thus created graph is a complete balanced bipartite graph.

After adding the dummy vertices, or if the number already was the same (step 308: no), the vertices in the vertex set A and the vertices in the vertex set B are matched in step 310 using Kuhn-Munkres algorithm as the minimum weight bipartite graph perfect matching algorithm. The used algorithm finds perfect matching between vertices in the vertex set A and the vertices in the vertex set B with lowest weight.

When the perfect matching is ready, for each vertex pair radios in the vertex pair are placed in step 311 to the same radio group (having one or more radios, depending how many plans are merged and whether or not a vertex pair comprises a dummy vertex/dummy vertices operating on different frequencies), and the location of an access point for the radio(s) in the radio group is determined in step 311 based on original planned locations of the radios placed in the access point. For example, the location may be an average of the original locations of the radios. When placing and determining the location has been done to each vertex pair, a merged plan has been determined.

Then it is checked in step 312, whether or not there are still one or more received frequency-band-specific network plans. If there is (step 312: yes), the merged plan determined in step 311 is used in step 313 as a first plan with radio groups being considered as radios, and the first unmerged frequency-band-specific plan in the order is taken in step 313 to be the second plan, and then the process proceeds to step 305 to place vertices representing the radios/radio groups to vertex sets.

If there are no more frequency-band-specific network plans to merge (step 312: no), i.e. there is only one merged network plan, the process proceeds to step 314 to interpret dummy vertices as disabled radios, and then outputting of the merged plan is caused in step 315. Then the automatically created merged plan may be further edited by a user and/or stored for later use.

Figure 7:
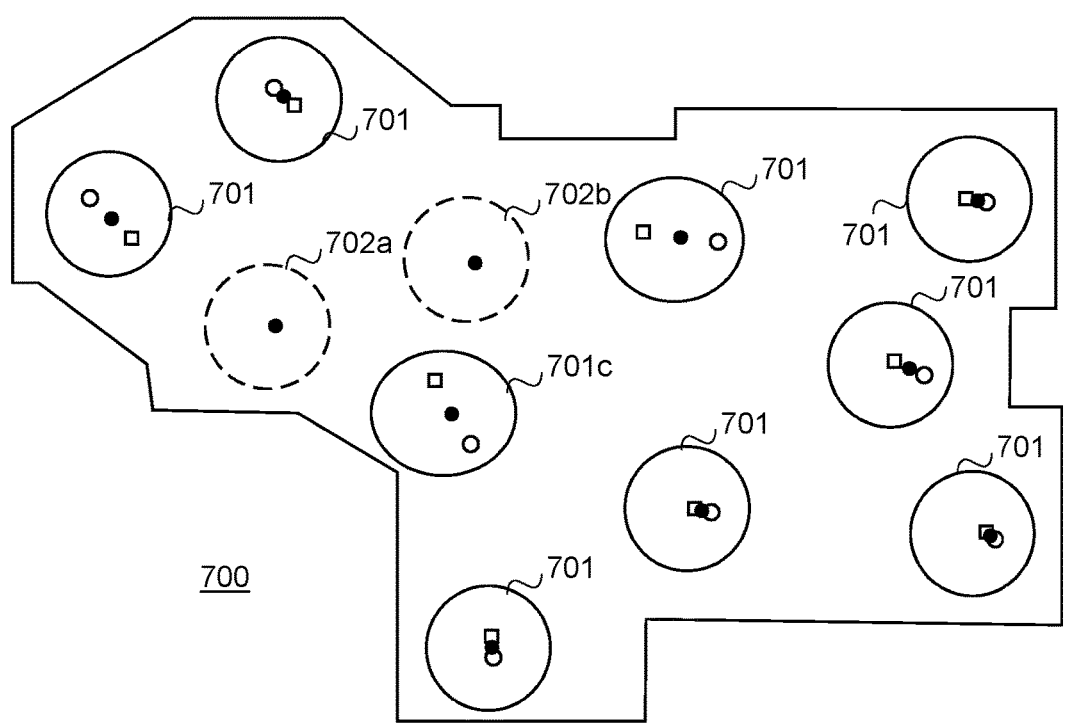
FIG. 7 illustrates a merged network plan created from plans in FIGS. 5A and 5B.

Assuming that the received network plans are those depicted in FIGS. 5A and 5B, FIG. 5A being a plan for 2.4 GHz WLAN and FIG. 5B being a plan for 5 GHz WLAN, FIG. 7 depicts the merged plan 700. In FIG. 7, the black dots depicts the locations of the radio groups, and thereby locations of corresponding access points, circles 701, 701c, with solid line depicts radio groups (access points) with two enabled radios, one 2.4 GHz and the other 5 GHz, and circles 702a, 702b with broken like depict radio groups (access points) having 5 GHz radios matched to dummy radios and therefore the radio groups (access points) have 2.4 GHz radios disabled. The original locations of the radios in original frequency-band-specific plans are shown in FIG. 7 with corresponding circles (2.4 GHz) and squares (5 GHz). However, it should be appreciated that the actually outputted merged plan may not show the original locations.

If only one frequency-band-specific network plan is received (step 302: no), there is nothing to merge, and outputting the frequency band plan is caused in step 316.

The process described above is very efficient (consuming less time and less processing capacity) since the merging algorithm is a computationally efficient algorithm and creating frequency-band-specific network plans is less complex than creating directly multi-band network plans. For example, the algorithm based on Kuhn-Munkres can find the pairs to be merged in polynomial time, whereas going through all possible subsets of pairs will take exponential time.

Although in the above examples, when three or more frequency-specific network plans are combined, the first two plans are combined and then the third, fourth, etc. are combined with a merged plan, that need not to be a case. One may first combine mere plans, for example combining first and second plan and third and fourth plan, and when there are no more frequency-band-specific plans to combine to each other, combining merged plans is started.

Further, the step of sorting the plans may be skipped over. In other words, the first plan may have less radios than a third plan.

However, sorting the plans as described with FIG. 3, and combining a merged plan with a frequency-band-specific plan according to the order so that the frequency-band-specific plan that has the smallest number of radios is the last one that will be merged, as described above, minimizes an error caused by relocating radios in the merging; when the two frequency-band-specific network plans having the two biggest number of radios are merged first, relocation of radios (radio groups) that happens after that is most probably smaller since dummy vertices do not cause relocation of the radios.

In a further implementation, once the merged plan has been created, a possibility to reduce the number of radio groups, and thereby the number of physical access points, is checked. Prerequisites for the implementation include that flexible frequency band selection is supported by access points and that information on one or more requirements based on which the frequency-band-specific network plans have been created is available. Typically the requirements define capacity requirements and coverage requirements. Further, a requirement may cover a specific part of a plan or be the same throughout the plan. Coverage requirements typically define a minimum signal strength, such as at least −70 dBm everywhere, or at least −70 dBm in general but in a specific part of the planning area at least −67 dBm. The coverage requirements may be the same for each frequency band, or specified for each frequency band. Capacity requirements define at least the intended capacity, i.e. how many clients (devices, running applications, etc.) it is intended to support. At the simplest the capacity requirement may be given as a required bit rate (bits per second). It may be that to fulfill coverage requirements there has to be five radios spread over the plan, but to achieve the capacity requirements there has to be seven radios but there are no requirements how they are located (as long as the signal strength is sufficient to fulfill the coverage requirements).

Figure 4:
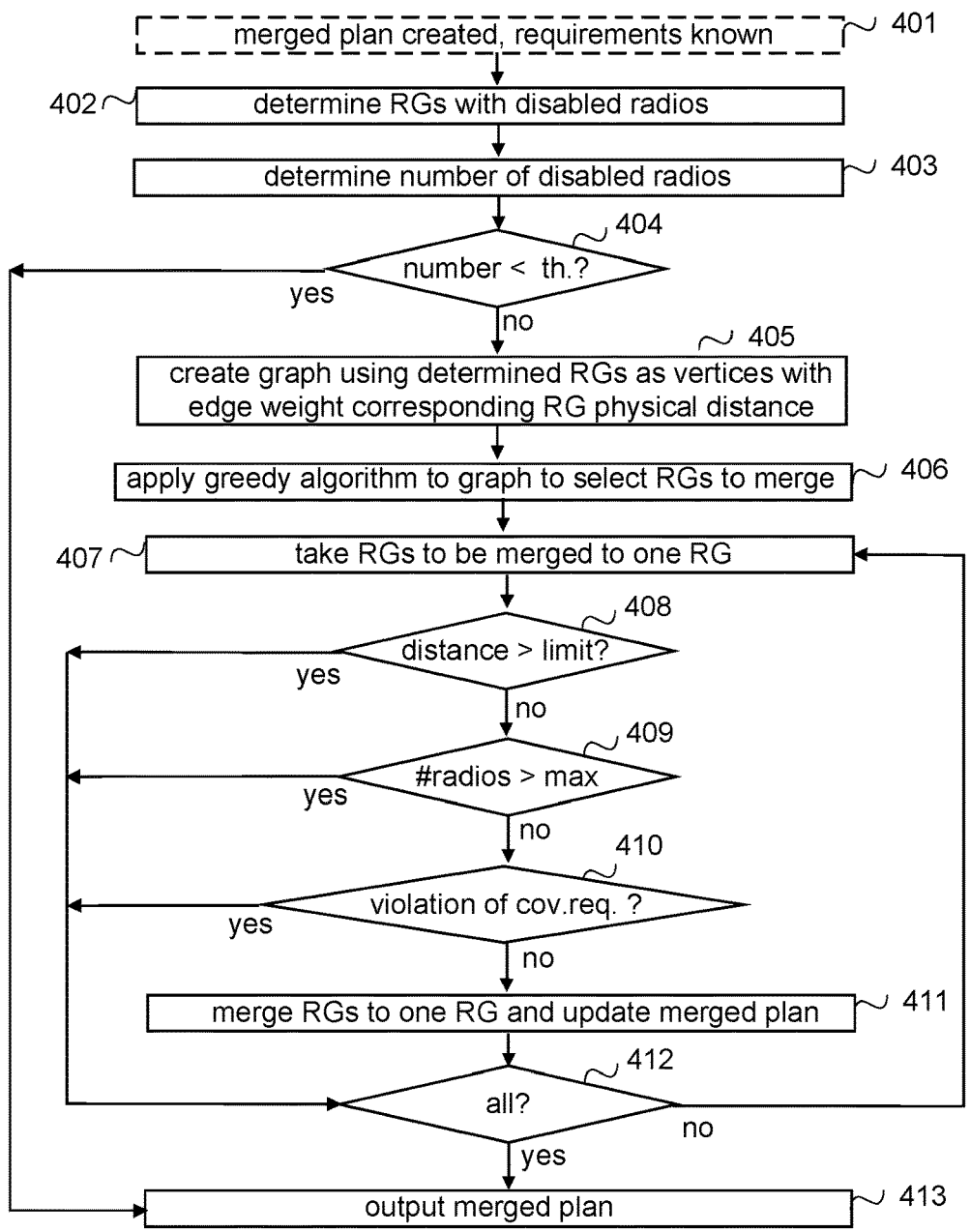

FIG. 4 illustrates a functionality how to minimize the number of radio groups (RGs), and thereby the number of access points.

Referring to FIG. 4, it is assumed (step 401) that a merged plan has been created and the requirements are known (step 401). It bears no significance how the merged plan has been created and how the requirements are obtained/retrieved.

The reduction process is performed for all radio groups having one or more disabled radios. Therefore, those radio groups (RGs) that have disabled radios are determined in step 402, and the number of disabled radios in the groups is determined in step 403. Using the example illustrated in FIG. 7, the radio groups denoted by 702a, 702b would be determined in step 402, and the number determined in step 403 would be two. Then it is checked in step 404 whether or not the number of disabled radios is smaller than a threshold (th) for further merging. The threshold is typically two, otherwise there is nothing to merge, but it may be set to be more than two.

If the number of disabled radios is not smaller than the threshold (step 404: no), a weighted graph is created is step 405 using the radio groups determined in step 402 as the vertices. In other words, the created weighted graph has edges between all vertices representing the radio groups that have disabled radios and thereby could be merged. The edge weight is set to correspond a physical distance between the locations of the corresponding radio groups in the merged plan.

Once the weighted graph is ready, it is used in step 406 to select amongst the radio groups those radio groups that can be merged together to one radio group. For example, a greedy algorithm from the shortest edge to the longest edge may be used to select the radio groups that will be merged. Using the example in FIG. 7, after the merging, if performed, instead of two radio groups 702a, 702b with two disabled radios there could be one radio group with the two enabled radios of the same frequency. The term "set" is used below for radio groups selected to be merged to one radio group.

Once one or more sets are selected in step 406, they can be processed one by one, starting, for example, from the set whose maximum physical distance between the locations of the radio groups to be merged is the smallest one, when compared to other sets. It should be appreciated that any other way to determine the processing order of the sets may be used, and the sets may be processed in a random order.

When a set comprising radio groups to be merged to one radio group is taken in step 407 to be processed, it is checked in step 408, whether any of the physical distances between the locations of the radio groups to be merged to one radio group exceeds a preset limit. By this check it is ensured that locations of the radio groups, and hence radios, are not changed too much, and thereby also the signal levels in the merged plan are not changed too much. The preset limit may be a default value that may depend on frequencies on the plans that are merged. Further, a user may be provided a possibility to adjust what is considered as too much change in location, by providing the user a possibility to change the value of the preset limit.

If the distance(s) remain within the preset limit (step 408: no), it is checked in step 409 whether or not the number (i.e. #) of enabled radios in the radio groups that are to be merged to one radio group exceeds a maximum number (max #) of radios that can be installed to the access point. For example, if an access point can have at most three radios, by this check a situation in which after merging together two radio groups both having two enabled radio and one disabled radio, four radios should be installed to the access point, is avoided.

If the maximum number is not exceeded (step 409: no) it is checked in step 410 whether or not the number of radio groups after the merge would violate the coverage requirements of the different frequency bands that are currently merged. To illustrate this, a couple of examples are described. In an example, the information received in step 401 contains a merged plan of plans A and B with five radio groups, the first and second group each with a disabled radio and a radio for B, the three other groups each with a radio for A and a radio for B, as coverage requirements for the plan A three radios and for the plan B four radios, and as capacity requirements for the plan A three radios and for the plan B five radios. (The capacity requirements are determined based on how many clients the radios have to support.) Assuming that merging the first and second group fulfills the previous criteria (checks in steps 408 and 409), the merging would end up to a solution in which there is one radio group having two radios for B and three radio groups having one radio for A and one radio for B. In other words, there will be three radio groups having radios for A, which fulfill the coverage requirement for the plan A, and four radio groups having radios for B, a result that fulfills the coverage requirement for the plan B. Hence, there would be no violation of the coverage requirements. In another example the information received in step 401 contains a merged plan of plans A, B and C with five radio groups, the first and second group each with two disabled radios and a radio for C, the third group with one disabled radio and a radio for A and a radio for C, the fourth group with one disabled radio and a radio for B and a radio for C, the fifth group with a radio for A, a radio for B and a radio for C, as coverage requirements for the plan A two radios, for the plan B two radios, and for the plan C three radios, and as capacity requirements for the plan A one radio, for the plan B two radios and for the plan C five radios. Assuming that a first set merges the first and the third radio group, and a second set merges the second and the fourth radio group, when the first set is processed and has passed the two previous checks, after the merging of the first set (the second set not yet merged) the first and third radio groups would be replaced by a first further merged radio group having a radio for A and two radios for C, the second, fourth and fifth group still remaining. The end result of the merging would be two radio groups with radios for A, two radio groups with radios for B and four radio groups with radios for C which do not violate the coverage requirements (at least two for A, two for B and three for C). Assuming that after that the second set is processed and has passed the two previous checks, after the merging of the second set (the first set already merged), the second and the fourth radio groups would be replaced by a second further merged radio group having a radio for B and two radios for C. The end result would be two radio groups with radios for A, two radio groups with radios for B and three radio groups with radios for C. Even that merge would not violate the coverage requirements (at least two for A, two for B and three for C). However, any further merge would violate the coverage requirements since it would end up to two radio groups for C, or one radio group for A or B.

If no violation of the coverage requirements is detected (step 410: no) the radio groups are merged to one radio group and the merged plan is updated in step 411 correspondingly. For example, if radio groups denoted by 702a and 702b in FIG. 7 are merged to one radio group comprising two radios for 5 GHz frequency band, the plan would be updated correspondingly. The updating includes defining a new location for the merged radio group, the location being preferably an average of the locations of the merged radio groups in the original merged plan.

Then it is checked in step 412, whether or not the process has been performed to all sets of radio groups to be merged to one. If not, the process proceeds to step 407 to take an unprocessed set to be processed, using the updated merged plan in the violation check of step 410.

If all sets of radio groups to be merged to one have been processed (step 412: yes), the updated merged plan is outputted in step 413.

In the illustrated example, if the distance(s) do not remain within the preset limit (step 408: yes), or if merging the radio groups would end up exceeding the maximum number (step 409: yes) of radios in one access point, or if the merging would violate the coverage requirements (step 410: yes), the radio groups in the set under processing are not merged and the process proceeds to step 412 to check whether all sets are processed.

If the number of disabled radios is smaller than the threshold (step 404: yes), no reduction process is performed, and the process proceeds to step 413 to output the merged plan that is the same as the one in step 401 given as an input.

However, in another example, if the merging would violate the coverage requirements (step 410: yes), the process proceeds directly to step 413 to output merged plan, since the remaining merges would inevitable violate the requirements as well. Further, if the sets are processed in an ascending distance order (i.e. starting from the set whose maximum distance between merged locations is the smallest one), the process may, if the distance(s) do not remain within the preset limit (step 408: yes), proceed directly to step 413 to output merged plan, since the distance check would inevitably fail also for the remaining sets.

Further, if the final locations of the radio groups, and thereby the final locations of access points are determined later, and the merged plan created during the reduction process illustrated in FIG. 4, are used as initial locations, checking the distances between the radio groups to be merged in step 408 may be omitted.

The steps and related functions described above in FIGS. 2 to 4 are in no absolute chronological order, and some of the steps may be performed simultaneously or in an order differing from the given one. Other functions can also be executed between the steps or within the steps. For example, in FIG. 2 the steps of creating set of pairs and assigning utilities may include, if the number of radios in the plans to be merged is different, adding elements representing disabled radios with a zero utility, as described with steps 307 to 309 in FIG. 3. Some of the steps or part of the steps can also be left out or replaced by a corresponding step or part of the step. For example, checking steps of 404 and/or 408 and/or 410 may be left out (without any prerequisites, or for steps 408 and/or 410 with any pre-condition, for example no checking if a planning area is a homogeneous planning area).

The techniques and methods described herein may be implemented by various means so that an apparatus (computing device) configured to provide multi band network planning tool based on at least partly on what is disclosed above with any of FIGS. 1 to 7, including implementing one or more functions/operations described above with an embodiment/example, for example by means of any of FIGS. 2 to 7, comprises not only prior art means, but also means for implementing the one or more functions/operations of a corresponding functionality described with an embodiment, for example by means of any of FIGS. 2 to 7, and it or they may comprise separate means for each separate function/operation, or means may be configured to perform two or more functions/operations. For example, one or more of the means and/or the merge unit described above may be implemented in hardware (one or more devices), firmware (one or more devices), software (one or more modules), or combinations thereof. For a hardware implementation, the apparatus(es) of embodiments/examples may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, logic gates, other electronic units designed to perform the functions described herein by means of FIGS. 2 to 7, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the computing device (apparatus) described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 8:
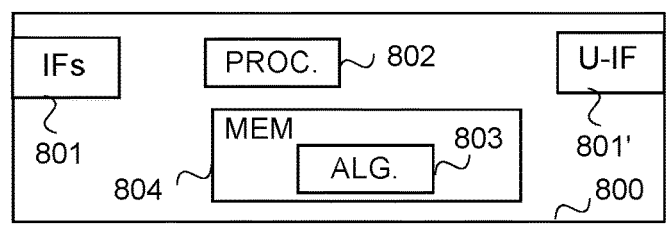
FIG. 8 is a schematic block diagram.

FIG. 8 provides an apparatus according to some embodiments of the invention. FIG. 8 illustrates an apparatus configured to carry out the functions described above in connection with the computing device. Each apparatus 800 may comprise one or more processing circuitry, such as at least one processor 802, and at least one memory 804, including one or more algorithms 803, such as a computer program code (software) wherein the at least one memory and the computer program code (software) are configured, with the at least one processor, to cause the apparatus to carry out any one of the exemplified functionalities of the computing device. The apparatus may further comprise different interfaces 801, such as one or more user interfaces 801'.

Referring to FIG. 8, at least one of the processing circuitries in the apparatus 800 is configured to provide the merge unit, or any corresponding sub-unit, and to carry out functionalities, described above by means of any of FIGS. 2 to 7, by one or more circuitries.

The memory 804 or part of it may be implemented using any suitable data storage technology, such as semiconductor based memory devices, flash memory, magnetic memory devices and systems, optical memory devices and systems, fixed memory and removable memory.

The one or more interfaces 801 may comprise communication interfaces comprising hardware and/or software for realizing communication connectivity according to one or more communication protocols.

The one or more user interfaces 801' may be any kind of a user interface, for example a screen, microphone and one or more loudspeakers for interaction with the user.

As used in this application, the term 'circuitry' refers to all of the following: (a) hardwareonly circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a computing device.

In an embodiment, the at least one processor, the memory, and the computer program code form processing means or comprises one or more computer program code portions for carrying out one or more operations according to any one of the embodiments of FIGS. 2 to 7 or operations thereof.

Embodiments as described may also be carried out in the form of a computer process defined by a computer program or portions thereof. Embodiments of the methods described in connection with FIGS. 2 to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A computer implemented method comprising:
receiving at least a first frequency-band-specific network plan for a network and a second frequency-band-specific network plan for the same network, each network plan defining in the network plan initial physical locations for radios of the corresponding frequency band to place the radios in the network, the radios representing physical access points in the network;
creating a set of pairs, in which a pair contains a radio from the first frequency-band-specific network plan as a first element representing an access point in the network and a radio from the second frequency-band-specific network plan as a second element representing an access point in the network, the set of pairs containing a plurality of pairs so that there is for each radio in the first frequency-band-specific network plan a pair with each radio in the second frequency-band-specific network plan;
assigning to each pair a utility;
selecting a subset of pairs that maximizes a sum of utilities and contains any radio from the first frequency-band-specific network plan and from the second frequency-band-specific network plan at most once; and
creating a merged network plan by performing, for each pair in the selected subset of pairs, placing radios in the pair into the same radio group, which represents a physical multi-band access point in the merged network plan for the network, and selecting a physical location of the radio group in the network plan based on physical locations of the corresponding radios in the first and second frequency-band-specific network plans, the physical location of the radio group indicating where to place the corresponding multi-band access point in the network.

2. The computer implemented method of claim 1, further comprising:
sorting the frequency-band-specific network plans by the number of radios in the frequency-band-specific network plans so that the network plans are after the sorting in an order; and merging the frequency-band-specific network plans in the order.

3. The computer implemented method of claim 1, further comprising:
receiving more than two frequency-band-specific network plans;
repeating the creating a set of pairs, assigning utilities, selecting the subset of pairs and creating a merged network plan by using a previously created merged network plan as the first frequency-band-specific network plan and an unmerged frequency-band-specific network plan as the second frequency-band-specific network plan until there are no unmerged network plans.

4. The computer implemented method of claim 1, further comprising:
creating the set of pairs as a weighted bipartite graph by adding for each radio in the first frequency-band-specific network plan a vertex to a left side of the graph, for each radio in the second frequency-specific network plan a vertex to a right side of the graph, and for each pair in the set of radio pairs, a corresponding edge so that the incident vertices represent the radios in the pair, and assigning for each pair in the set of radio pairs, a weight of the corresponding edge by subtracting the utility from a large enough number so that all edge weights remain nonnegative, or by setting the weight to be the distance between the radios represented by the incident vertices of the edge;
in response to one of the right and left sides having fewer vertices than the other, opposite side, adding dummy vertices to the one having fewer vertices so that the number of vertices on the left side equals to the number of vertices on the right side, adding, for each dummy vertex, dummy edges to all vertices on the opposite side so that the other incident vertex is the dummy vertex and the other is the vertex that represents the radio on the opposite side, and assigning the same weight to the dummy edges;
performing the selecting by applying a minimum weight bipartite graph perfect matching algorithm to the weighted bipartite graph; and
interpreting dummy vertices as disabled radios when creating the merged network plan.

5. The computer implemented method of claim 4, further comprising using Kuhn-Munkres algorithm as the minimum weight bipartite graph perfect matching algorithm.

6. The computer implemented method of claim 4, further comprising:
determining from the merged network plan mergeable radio groups, a mergeable radio group having one or more disabled radios;
creating a weighted graph having vertices that represent the mergeable radio groups and edge weights that correspond to distances between corresponding mergeable radio groups;
using the weighted graph to select radio group pairs to be merged;
checking, for each radio group pair to be merged, whether or not the number of enabled radios in the radio group pair exceeds the maximum number of enabled radios in one access point, and whether coverage requirements are fulfilled after the merge; and
if the number of enabled radios in the radio group pair does not exceed the maximum number and if the coverage requirements are fulfilled after the merge, updating the merged network plan to comprise instead of such radio group pair one merged radio group.

7. The computer implemented method of claim 6, further comprising checking also for each radio group pair to be merged, whether or not any of the distances between locations of the radio group pairs exceeds a preset limit, and performing the updating only if none of the distances exceeds the preset limit.

8. The computer implemented method of claim 6, further comprising:
applying a greedy algorithm to the weighted set to select the radio group pairs.

9. An apparatus comprising
at least one processor; and
at least one memory including computer program code;
the at least one memory and computer program code configured to, with the at least one processor, cause the apparatus at least to perform, in response to receiving at least a first frequency-band-specific network plan for a network and a second frequency-band-specific network plan for the same network, each network plan defining in the network plan initial physical locations for radios of the corresponding frequency band to place the radios in the network, the radios representing physical access points in the network:
creating a set of pairs, in which a pair contains a radio from the first frequency-band-specific network plan as a first element representing an access point in the network and a radio from the second frequency-band-specific network plan as a second element representing an access point in the network, the set of pairs containing a plurality of pairs so that there is for each radio in the first frequency-band-specific network plan a pair with each radio in the second frequency-band-specific network plan;
assigning to each pair a utility;
selecting a subset of pairs that maximizes a sum of utilities and contains any radio from the first frequency-band-specific network plan and from the second frequency-band-specific network plan at most once; and
creating a merged network plan by performing, for each pair in the selected subset of pairs, placing radios in the pair into the same radio group, which represents a physical multi-band access point in the merged network plan for the network, and selecting a physical location of the radio group in the network plan based on physical locations of the corresponding radios in the first and second frequency-band-specific network plans, the physical location of the radio group indicating where to place the corresponding multi-band access point in the network.

10. The apparatus of claim 9, wherein the at least one memory and computer program code configured to, with the at least one processor, further cause the apparatus at least to perform:
sorting the frequency-band-specific network plans by the number of radios in the frequency-band-specific network plans so that the network plans are after the sorting in an order; and
merging the frequency-band-specific network plans in the order.

11. The apparatus of claim 9, wherein the at least one memory and computer program code configured to, with the at least one processor, further cause the apparatus at least to perform:
creating the set of pairs as a weighted bipartite graph by adding for each radio in the first frequency-bandspecific network plan a vertex to a left side of the graph, for each radio in the second frequency-specific network plan a vertex to a right side of the graph, and for each pair in the set of radio pairs, a corresponding edge so that the incident vertices represent the radios in the pair, and assigning for each pair in the set of radio pairs, a weight of the corresponding edge by subtracting the utility from a large enough number so that all edge weights remain nonnegative, or by setting the weight to be the distance between the radios represented by the incident vertices of the edge;

in response to one of the right and left sides having fewer vertices than the other, opposite side, adding dummy vertices to the one having fewer vertices so that the number of vertices on the left side equals to the number of vertices on the right side, adding, for each dummy vertex, dummy edges to all vertices on the opposite side so that the other incident vertex is the dummy vertex and the other is the vertex that represents the radio on the opposite side, and assigning the same weight to the dummy edges;

performing the selecting by applying a minimum weight bipartite graph perfect matching algorithm to the weighted bipartite graph; and interpreting dummy vertices as disabled radios when creating the merged network plan.

12. The apparatus of claim 11, wherein the at least one memory and computer program code configured to, with the at least one processor, further cause the apparatus at least to perform:

determining from the merged network plan mergeable radio groups, a mergeable radio group having one or more disabled radios;

creating a weighted graph having vertices that represent the mergeable radio groups and edge weights that correspond to distances between corresponding mergeable radio groups;

using the weighted graph to select radio group pairs to be merged;

checking, for each radio group pair to be merged, whether or not the number of enabled radios in the radio group pair exceeds the maximum number of enabled radios in one access point, and whether coverage requirements are fulfilled after the merge; and if the number of enabled radios in the radio group pair does not exceed the maximum number and if the coverage requirements are fulfilled after the merge, updating the merged network plan to comprise instead of such radio group pair one merged radio group.

13. The apparatus of claim 12, wherein the at least one memory and computer program code configured to, with the at least one processor, further cause the apparatus at least to perform checking also for each radio group pair to be merged, whether or not any of the distances between locations of the radio group pairs exceeds a preset limit, and performing the updating only if none of the distances exceeds the preset limit.

14. A non-transitory computer readable medium comprising program instructions for causing a computing apparatus at least to:

create, in response to at least a first frequency-band-specific network plan for a network and a second frequency-band-specific network plan for the same network, each network plan defining in the network plan initial physical locations for radios of the corresponding frequency band to place the radios in the network, the radios representing physical access points in the network, a set of pairs, each pair having a radio in the first frequency-band-specific network plan as the first element of the pair and a radio in the second frequency-band-specific network plan as the second element of the pair;

assign to each pair a utility;

select a subset of pairs that maximizes a sum of utilities and contains any radio from the first and second frequency-band-specific network plan at most once; and create a merged network plan by performing for each pair in the selected subset of pairs placing radios in the pair into the same access point radio group and selecting a physical location of the access point radio group in the merged network plan based on physical locations of corresponding radios in the first and second frequency-band-specific network plans, the physical location of the radio group indicating where to place the corresponding multi-band access point in the network.

15. The non-transitory computer readable medium of claim 14, further comprising program instructions for causing the computing apparatus at least to:

sort the frequency-band-specific network plans by the number of radios in the frequency-band-specific network plans so that the network plans are after the sorting in an order; and merge the frequency-band-specific network plans in the order.

16. The non-transitory computer readable medium of claim 14, further comprising program instructions for causing the computing apparatus at least to:

create the set of pairs as a weighted bipartite graph by adding for each radio in the first frequency-band-specific network plan a vertex to a left side of the graph, for each radio in the second frequency-specific network plan a vertex to a right side of the graph, and for each pair in the set of radio pairs, a corresponding edge so that the incident vertices represent the radios in the pair, and assigning for each pair in the set of radio pairs, a weight of the corresponding edge by subtracting the utility from a large enough number so that all edge weights remain nonnegative, or by setting the weight to be the distance between the radios represented by the incident vertices of the edge;

add, in response to one of the right and left sides having fewer vertices than the other, opposite side, dummy vertices to the one having fewer vertices so that the number of vertices on the left side equals to the number of vertices on the right side, add, for each dummy vertex, dummy edges to all vertices on the opposite side so that the other incident vertex is the dummy vertex and the other is the vertex that represents the radio on the opposite side, and assign the same weight to the dummy edges;

select by applying a minimum weight bipartite graph perfect matching algorithm to the weighted bipartite graph; and interpret dummy vertices as disabled radios when creating the merged network plan.

17. The non-transitory computer readable medium of claim 16, further comprising program instructions for causing the computing apparatus at least to use Kuhn-Munkres algorithm as the minimum weight bipartite graph perfect matching algorithm.

18. The non-transitory computer readable medium of claim 16, further comprising program instructions for causing the computing apparatus at least to:

determine from the merged network plan mergeable radio groups, a mergeable radio group having one or more disabled radios;

create a weighted graph having vertices that represent the mergeable radio groups and edge weights that correspond to distances between corresponding mergeable radio groups;

use the weighted graph to select radio group pairs to be merged;

check, for each radio group pair to be merged, whether or not the number of enabled radios in the radio group pair exceeds the maximum number of enabled radios in one access point, and whether coverage requirements are fulfilled after the merge; and if the number of enabled radios in the radio group pair does not exceed the maximum number and if the coverage requirements are fulfilled after the merge, update the merged network plan to comprise instead of such radio group pair one merged radio group.

19. The non-transitory computer readable medium of claim 18, further comprising program instructions for causing the computing apparatus at least to: check also for each radio group pair to be merged, whether or not any of the distances between locations of the radio group pairs exceeds a preset limit, and to update the merged network plan only if none of the distances exceeds the preset limit.

20. The non-transitory computer readable medium of claim 18, further comprising program instructions for causing the computing apparatus at least to apply a greedy algorithm to the weighted set to select the radio group pairs.

* * * * *